United States Patent Office 3,118,940
Patented Jan. 21, 1964

3,118,940
HYDRAZINO ETHERS AND PROCESS FOR THEIR MANUFACTURE
Jean Druey, Riehen, Paul Schmidt, Therwil, and Max Wilhelm and Kurt Eichenberger, Basel, Switzerland, assignors to Ciba Corporation, a corporation of Delaware
No Drawing. Filed Jan. 26, 1960, Ser. No. 4,614
Claims priority, application Switzerland Feb. 11, 1959
13 Claims. (Cl. 260—569)

This invention provides new ethers and their salts and a process for the manufacture of these compounds. The new ethers have the general formula

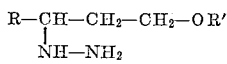

in which R indicates a low alkyl radical, such as ethyl or propyl but more especially methyl and R' is a radical of aliphatic character, more especially a substituted or unsubstituted aliphatic, cycloaliphatic or araliphatic hydrocarbon radical, such as a cycloalkyl radical, e.g., cyclopentyl or cyclohexyl, or a benzyl radical, which may also contain substituents, such as lower alkoxy groups, e.g., methoxy, ethoxy, methylene-dioxy or lower alkyl radicals, for instance methyl or ethyl, or a halogen atom, such as chlorine, bromine or iodine or trifluoromethyl, but more especially a low alkyl or alkenyl radical such as ethyl, propyl, allyl or butyl but primarily methyl, or a lower alkoxy-alkyl radical, e.g., a methoxy, ethoxy, propoxy or butoxy-ethyl radical.

The new ethers possess a valuable stimulating effect upon the central nervous system with unusual distribution of the stimulated area. They may therefore be used for enhancement of central nervous functions, for example in cases of central nervous depression.

Especially valuable are compounds of the formula $$CH_3-CH-CH_2-CH_2-O-Alk$$
$$\quad\quad\;|$$
$$\quad\;NH-NH_2$$

in which Alk indicates a lower alkyl radical, primarily methyl or ethyl, but particularly butyl, and their salts.

The new ethers are prepared by methods known per se. Preferably a ketone of the formula

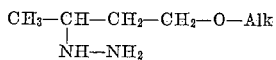

wherein R and R' have the meaning given above is treated with hydrazine, advantageously in the form of a mono-acid addition salt thereof, such as the monohydrochloride, and the condensation product is hydrogenated in the presence of a metal hydrogenation catalyst of the eight group of the periodic system, such as platinum oxide. The hydrogenation is preferably carried out in the presence of a solvent such as water or aqueous ethanol, at room temperature and under pressure. The hydrazines may be isolated in the usual way, e.g., by filtering off the catalyst, removing the solvent under reduced pressure, treating the residue with a concentrated sodium or potassium hydroxide solution, separating the oily hydrazine compound, drying it and subjecting it to fractional distillation under reduced pressure.

According to the nature of the starting materials used, the new compounds are obtained in the form of the racemates or their optically active antipodes. The racemates can be resolved into the antipodes in the customary manner.

The starting materials are known or can be prepared by known methods. They may also be formed under the reaction conditions.

In the specified processes also such derivatives of the starting materials can be used as under the reaction conditions are converted into the specified starting materials.

The new compounds form salts with inorganic and organic acids. As salt-forming acids are concerned, for example: such as give therapeutically acceptable salts such as hydrohalic acids, sulfuric acid, phosphoric acid, nitric acid, perchloric acid; aliphatic, alicyclic, aromatic or heterocyclic carboxylic or sulfonic acids, such as formic, acetic, propionic, oxalic, succinic, glycollic, lactic, malic, tartaric, citric, ascorbic, hydroxymaleic, dihydroxymaleic or pyroracemic acid; phenyl acetic, benzoic, p-aminobenzoic, anthranilic, p-hydroxybenzoic, salicylic or p-aminosalicylic acid; methane sulfonic, ethane sulfonic, hydroxyethane sulfonic, ethylene-sulfonic acid; toluene sulfonic, naphthalene sulfonic acids or sulfanilic acid. Resulting salts can be converted into the free bases in the manner known per se.

The new compounds, their salts or corresponding mixtures can be used, for example, in the form of pharmaceutical preparations. These contain the said compounds in admixture with a pharmaceutical organic or inorganic carrier material suitable for enteral or parenteral administration. As such are concerned substances that do not react with the described compounds, for example water, gelatine, lactose, petroleum jelly, starch, magnesium stearate, talc, vegetable oils, benzyl alcohols, gums, polyalkylene glycols, cholesterol or other known medicament carriers. The pharmaceutical preparations can be made up, for example, as tablets or dragees or in liquid form as solutions, suspensions or emulsions. If desired they are sterilized and/or contain auxiliary substances, such as preserving, stabilizing, wetting or emulsifying agents. They can also contain other therapeutically valuable substances. The preparations are produced by customary methods.

The invention also comprises any modification of the process in which a compound obtainable as an intermediate at any stage of the complete process is used as starting material and the remaining step or steps are carried out or in which the process is interrupted at any stage.

The following examples illustrate the invention:

*Example 1*

A neutrally reacting solution of 25 grams of hydrazine hydrate in 250 cc. of 2 N-hydrochloric acid is treated with stirring and ice cooling with 51 grams of β-methoxy-ethyl-methyl ketone. The resulting hydrazone is then hydrogenated at room temperature under a pressure of 12 atmospheres with 2 grams of platinum oxide as catalyst. Within 1 hour the quantity of hydrogen, 11.2 liters, calculated for one half mol is taken up. The catalyst is then filtered with suction and the filtrate evaporated under vacuum to dryness and the residue treated with 500 cc. of concentrated sodium hydroxide solution, as a result of which 2-hydrazino-4-methoxy-butane of the formula

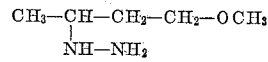

separates slowly as an oil. After separation in a separating funnel it can be distilled under a pressure of 11 mm. of mercury at 72–73° C.

*Example 2*

To a solution of 68 grams of hydrazine hydrochloride in 300 cc. of water are added 116 grams of β-ethoxy-ethyl-methyl ketone in 200 cc. of ethanol. After the addition of 2 grams of platinum oxide hydrogenation is carried out at room temperature under a pressure of 80 atmospheres. After 1 hour the absorption of hydrogen is complete. The catalyst is filtered off and the filtrate evaporated under vacuum to dryness. On the addition of 500 cc. of concentrated sodium hydroxide solution to the residue an oil separates which is isolated, dried over potassium hydroxide and distilled in a water jet vacuum. The 2-hydrazino-4-ethoxy-butane of the formula $$CH_3-CH-CH_2-CH_2-OC_2H_5$$
$$|$$
$$NH-NH_2$$

boils at 77–78° C. under 11 mm. pressure.

*Example 3*

To a solution of 144 grams of β-n-butoxy-ethyl-methyl ketone in 200 cc. of ethanol are added 68 grams of hydrazine hydrochloride in 300 cc. of water and the mixture, after the addition of 2 grams of platinum oxide, hydrogenated at room temperature under a pressure of 80 atmospheres. After the absorption of hydrogen is complete (1 hour), the catalyst is filtered with suction and the filtrate evaporated. The residue is treated with 500 cc. of concentrated sodium hydroxide solution, as a result of which an oil separates which is dried over potassium hydroxide and then fractionated. At 108–110° C. under 11 mm. pressure there distils 2-hydrazino-4-n-butoxy-butane of the formula $$CH_3-CH-CH_2-CH_2-O-CH_2-CH_2-CH_2-CH_3$$
$$|$$
$$NH-NH_2$$

*Example 4*

A solution of 119 grams of β-benzyloxy-ethyl-methyl ketone in 200 cc. of ethanol is treated with 49 grams of hydrazine hydrochloride in 200 cc. of water and, after the addition of 3 grams of platinum oxide, hydrogenation carried out under a pressure of 80 atmospheres at room temperature. After 1 hour the absorption of hydrogen is complete and the catalyst is filtered off. The filtrate is evaporated under vacuum and the residue treated with 500 cc. of concentrated sodium hydroxide solution and the separated oil dried over sodium hydroxide. The resulting 2-hydrazino-4-benzyloxy-butane of the formula $$CH_3-CH-CH_2-CH_2-O-CH_2-\phantom{XX}\langle\phantom{X}\rangle$$
$$|$$
$$NH-NH_2$$

distils at 103–107° C. under 0.3 mm. pressure.

The β-benzyloxy-ethyl-methyl ketone used as starting material can be prepared as follows:

To a mixture of 220 grams of benzyl alcohol and 140 grams of methyl-vinyl ketone is added at room temperature 1 cc. of concentrated sulfuric acid and the whole is allowed to stand for 24 hours. The reaction mixture is then treated with 20 grams of magnesium oxide, well stirred and filtered. The filtrate is distilled under vacuum. There is thus obtained the β-benzyloxy-ethyl-methyl ketone of the formula $$\langle\phantom{X}\rangle-CH_2-O-CH_2-CH_2-CO-CH_3$$

which boils at 125–130° C. under 12 mm. pressure.

*Example 5*

To a solution of 119 grams of β-(β'-n-butoxy-ethoxy)-ethyl-methyl ketone in 500 cc. of ethanol are added 44 grams of hydrazine hydrochloride in 200 cc. of water and, after the addition of 2 grams of platinum oxide, hydrogenation is carried out at room temperature under a pressure of 80 atmospheres. After 1 hour the absorption of hydrogen is complete. The catalyst is filtered with suction and the filtrate evaporated to dryness and the residue treated with 500 cc. of concentrated sodium hydroxide solution. An oil separates, which is subjected to fractional distillation. At 142–148° C. under 0.3 mm. pressure the 2-hydrazino-4-(β-n-butoxy-ethoxy)-butane of the formula $$CH_3-CH-CH_2-CH_2-O-CH_2-CH_2-O-CH_2-CH_2-CH_2-CH_3$$
$$|$$
$$NH-NH_2$$

boils.

The β-(β'-n-butoxy-ethoxy)-ethyl-methyl ketone can be prepared as follows:

A mixture of 118 grams of 2-n-butoxy-ethanol and 70 grams of methyl-vinyl ketone is treated with 1 cc. of concentrated sulfuric acid and the whole allowed to stand for 24 hours at room temperature. After the addition of 20 grams of magnesium oxide, the whole is well stirred and filtered. The filtrate is distilled, in which operation the β-(β'-n-butoxy-ethoxy)-ethyl-methyl ketone of the formula $$CH_3-CH_2-CH_2-CH_2-O-CH_2$$
$$-CH_2-O-CH_2-CH_2-CO-CH_3$$

boils at 122–125° C. under 12 mm. pressure.

What is claimed is:

1. A member selected from the group consisting of compounds of the formula $$R-CH-CH_2-CH_2-OR'$$
$$|$$
$$NH-NH_2$$

and its acid addition salts with therapeutically acceptable acids, in which R represents lower alkyl and R' represents a member selected from the group consisting of cycloalkyl, benzyl, lower alkoxy benzyl, methylene-dioxy benzyl, lower alkyl benzyl, halogenobenzyl, trifluoromethyl benzyl, lower alkyl, lower alkenyl, lower alkoxy, lower alkyl 2. 2-hydrazino-4-benzyloxy-butane.
3. An acid addition salt of the compound of claim 2 with a therapeutically useful acid.
4. Ethers of the formula $$CH_3-CH-CH_2-CH_2-O-Alk$$
$$|$$
$$NH-NH_2$$

in which Alk stands for a lower alkyl radical.

5. An acid addition salt of a compound of claim 4 with a therapeutically useful acid.
6. 2-hydrazino-4-methoxy-butane.
7. An acid addition salt of the compound of claim 6 with a therapeutically useful acid.
8. 2-hydrazino-4-ethoxy-butane.
9. An acid addition salt of the compound of claim 8 with a therapeutically useful acid.
10. 2-hydrazino-4-n-butoxy-butane.
11. An acid addition salt of the compound of claim 10 with a therapeutically useful acid.
12. 2-hydrazino-4-(β-n-butoxy-ethoxy)-butane.
13. An acid addition salt of the compound of claim 12 with a therapeutically useful acid.

References Cited in the file of this patent

UNITED STATES PATENTS

| | | |
|---|---|---|
| 2,371,133 | Graenacker et al. | Mar. 13, 1945 |
| 2,725,384 | Burness | Nov. 29, 1955 |
| 2,917,545 | Lum et al. | Dec. 15, 1959 |

FOREIGN PATENTS

| | | |
|---|---|---|
| 951,503 | Germany | Oct. 31, 1956 |

OTHER REFERENCES

Protiva et al.: "Chem. Listy," vol. 47, pages 1481 to 1485 (1953).